(12) United States Patent
Underwood, IV et al.

(10) Patent No.: US 10,819,825 B2
(45) Date of Patent: Oct. 27, 2020

(54) RESERVATION SYSTEM

(71) Applicant: Dropbox, Inc., San Francisco, CA (US)

(72) Inventors: George Milton Underwood, IV, Palo Alto, CA (US); Scott Cannon, Mountain View, CA (US); Sean Beausoleil, Sunnyvale, CA (US); Adam Cue, San Francisco, CA (US); Darian Edwards, Burnsville, MN (US); Steven Flory, Los Altos, CA (US); Elizabeth Armistead, San Francisco, CA (US); Elle Luna, San Francisco, CA (US); Josh Elman, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 115 days.

(21) Appl. No.: 16/285,565

(22) Filed: Feb. 26, 2019

(65) Prior Publication Data

US 2019/0199823 A1 Jun. 27, 2019

Related U.S. Application Data

(63) Continuation of application No. 14/137,968, filed on Dec. 20, 2013, now abandoned.

(60) Provisional application No. 61/911,929, filed on Dec. 4, 2013.

(51) Int. Cl.
*H04L 29/08* (2006.01)

(52) U.S. Cl.
CPC .................. *H04L 67/32* (2013.01)

(58) Field of Classification Search
CPC ...................................................... H04L 67/32
See application file for complete search history.

(56) References Cited

U.S. PATENT DOCUMENTS

| | | |
|---|---|---|
| 2002/0049086 A1 | 4/2002 | Otsu |
| 2004/0008832 A1 | 1/2004 | Mashimo |
| 2007/0130313 A1 | 6/2007 | King |
| 2007/0169189 A1 | 7/2007 | Crespo et al. |
| 2011/0085526 A1 | 4/2011 | Jospeh |
| 2012/0117183 A1 | 5/2012 | Wong |
| 2012/0166945 A1 | 6/2012 | Roberts |
| 2013/0031424 A1 | 1/2013 | Srivastava |

(Continued)

OTHER PUBLICATIONS

U.S. Appl. No. 14/137,968, filed Dec. 20, 2013, Office Action, dated Nov. 28, 2016.

(Continued)

*Primary Examiner* — Ryan Barrett
(74) *Attorney, Agent, or Firm* — Kevin W. Miller; Hickman Palermo Becker Bingham LLP

(57) ABSTRACT

A reservation system associated with an app installed on a user device can be used to regulate access to network-based features of a primary software service offered by the app. Network-based features can include providing access to online content items. Regulating access to these features can prevent overloading the backend service components that provide the network-based features. Growing the user base in a controlled fashion can benefit the user experience. A waitlist with a countdown can be used for users that have installed the app, but who are not yet allowed access to the network-based features of the primary software service. A user interface can display a reservation status (e.g., how many people are in front of the user in line, how many people are behind the user in line, and the like). This can increase user anticipation of the app features and reduce user attrition.

20 Claims, 10 Drawing Sheets

(56) References Cited

U.S. PATENT DOCUMENTS

| | | |
|---|---|---|
| 2013/0185385 A1 | 7/2013 | Jaudon |
| 2013/0347095 A1 | 12/2013 | Barjatiya |
| 2015/0007298 A1 | 1/2015 | Menon |
| 2015/0039689 A1 | 2/2015 | Pridmore |
| 2015/0088655 A1 | 3/2015 | Taylor et al. |
| 2015/0153935 A1* | 6/2015 | Underwood, IV ...... H04L 67/32 715/738 |
| 2015/0293760 A1 | 10/2015 | Alevoor |
| 2016/0164927 A1 | 6/2016 | Naik |

OTHER PUBLICATIONS

Underwood IV, U.S. Appl. No. 14/137,968, filed Dec. 20, 2013, Final Office Action, dated Jun. 2, 2017.

Underwood IV, U.S. Appl. No. 14/137,968, filed Dec. 20, 2013, Advisory Action, dated Sep. 8, 2017.

Underwood IV, U.S. Appl. No. 14/137,968, filed Dec. 20, 2013, Final Office Action, dated Feb. 29, 2016.

Underwood IV, U.S. Appl. No. 14/137,968, filed Dec. 20, 2013, Office Action, dated Aug. 28, 2015.

Underwood IV, U.S. Appl. No. 14/137,968, filed Dec. 20, 2013, Office Action, dated Jul. 19, 2018.

Underwood IV, U.S. Appl. No. 14/137,968, filed Dec. 20, 2013, Interview Summary, dated Feb. 8, 2019.

Underwood IV, U.S. Appl. No. 14/137,968, filed Dec. 20, 2013, Final Office Action, dated Dec. 13, 2018.

Rosenberg et al., "RFC 3261—Session Initation Protocol", dated Jun. 2002, https://www.ietf.org/rfc/rfc3261.txt.

Postel et al., "RFC 959—File Transfer Protocol", dated Oct. 1985, https://tools.ietf.org/html/rfc959.

* cited by examiner

RESERVATION SYSTEM

CROSS-REFERENCE TO RELATED APPLICATION

This application is a continuation of U.S. patent application Ser. No. 14/137,968, filed Dec. 20, 2013; which claims the benefit of U.S. Provisional Application No. 61/911,929, filed Dec. 4, 2013," the disclosure of which is incorporated by reference herein in its entirety.

BACKGROUND

The present disclosure relates generally to computing applications and services, and more specifically to a reservation system for allowing access to functionality of an application or service.

Testing with actual users is often required for software products and services, especially for systems that have high backend server demands. In some instances, user capacity limits are imposed on the system to ensure that the system is not overwhelmed by a sudden spike in system traffic. For example, the system may be initially released or tested with only a relatively small number of users. Private betas can be used to moderate access to a product while changes are made in advance of a broaderrelease.

SUMMARY

Apps and software services that serve online content items to user devices rely on backend service components to provide content items to user devices. These backend service components have server-load and other constraints. If constraints are exceeded, the user experience for users of the app or service is harmed. Therefore, growing the user base in a managed and controlled fashion can benefit the user experience. Controlled user base growth can also provide for additional time to test, troubleshoot, and debug software while the software is being used by a smaller number of users.

Certain embodiments of the present invention relate to a reservation system that can manage growth of a user base for a primary service provided via user-installed software, such as an app. In some embodiments, the system distributes reservation numbers to users for access to a primary service associated with an app. When a reservation becomes allowed, the user that is associated with the reservation can be permitted to access a primary service via the user-installed app (e.g., create an account or otherwise use the primary service). While a reservation can be associated with a user, one or more user devices, and/or one or more user accounts, the following description focuses on reservation that is associated with a user.

In some embodiments, reservation numbers can be sequential. A reservation number can be linked to a private code assigned by the reservation system. In some embodiments, the user reservation data (e.g., reservation number and private code) can be provided to a user or user device. For example, the reservation number and private code can be transmitted to a user device running an app associated with the reservation system or the backend service, and the app can store the received data. In another example, if the user has not launched the app yet (e.g., app is not installed or app has not been opened on the user device), the reservation number and private code can be transmitted to the user or user device in an electronic message, such as text message or email (e.g., using a phone number or email address that the user registered). This can allow the reservation system to begin to operate before a user launches the app or before the app is available for users to install on their devices.

A reservation user interface for the app can be displayed on a user device. The reservation user interface can display a number of people in front of the user, a number of people behind the user, and/or other information about the waitlist. In some embodiments, information about the waitlist can be animated in the form of a countdown (or count up). The animated countdown can show real-time or near real-time progress in the waitlist position. Displaying the status of the reservation to the user can reduce typical user attrition associated with current systems. In some embodiments, such a user interface can be displayed every time a user opens the app until access to a primary service is granted. In some embodiments, other app functionalities are disabled until access to the primary service is granted.

When the reservation system determines that a user holding a particular reservation number should be allowed access to the primary services, access permissions associated with the reservation can be changed on the reservation system and/or the user device. The user device can then transmit a message requesting access to the primary service. In some embodiments, the request message can be sent to one or both of the reservation system or the primary service system. The reservation system or the primary service system can perform various cross-checks to confirm that the particular user is indeed permitted to access the primary service. This can prevent unauthorized access (e.g., access to the primary service out of order). If allowed, the user can create or initialize an account with the primary service.

The following detailed description together with the accompanying drawings will provide a better understanding of the nature and advantages of the present invention.

DETAILED DESCRIPTION

Figure 1:
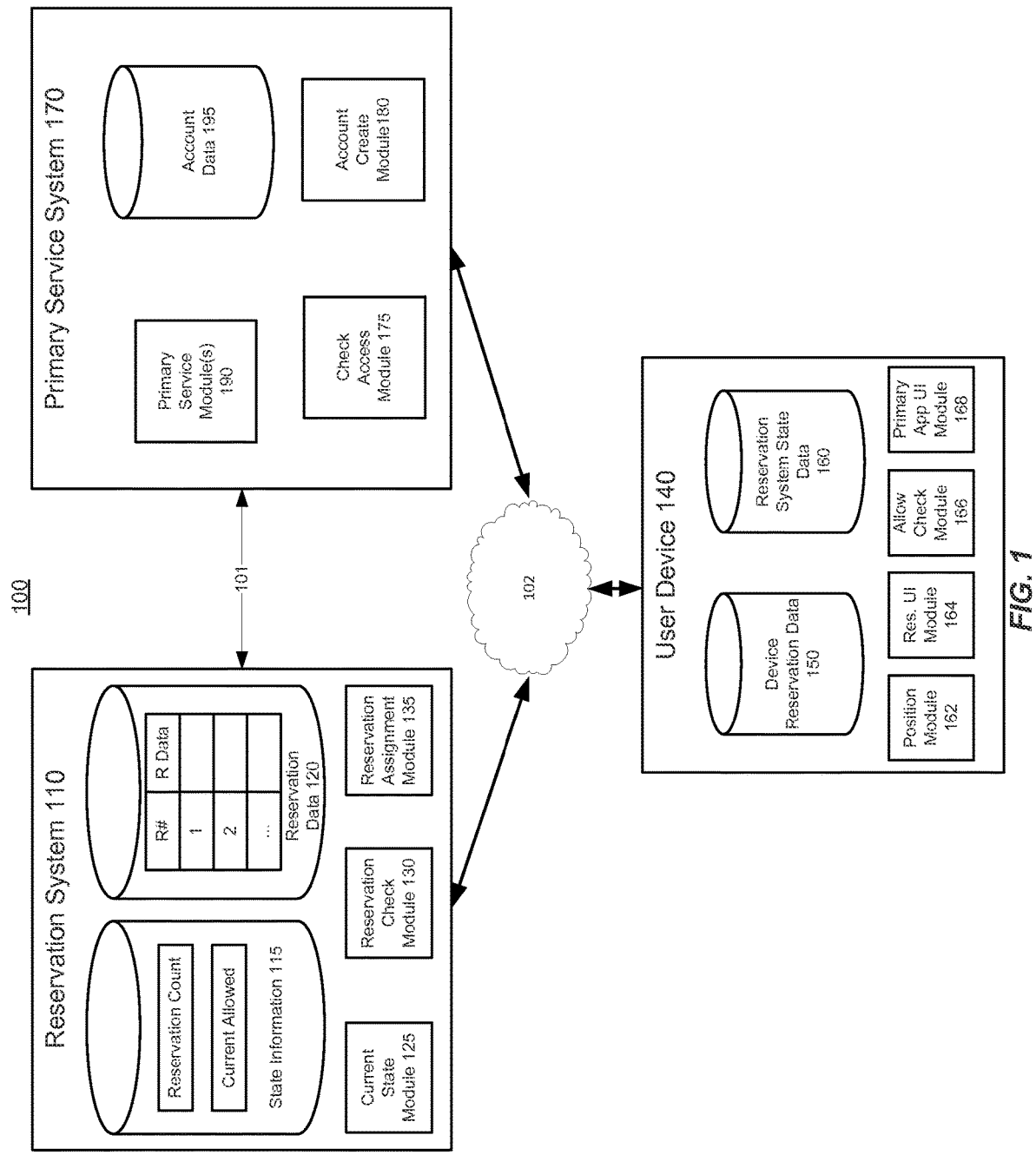
FIG. 1 shows a system for implementing a reservation method in accordance with some embodiments of the present invention.

When a software product is tested or made available to the public, it can be beneficial to limit the number of users initially. This can be especially true for applications that access online content stored on remote server computers due to the possibility that the servers will be overloaded. That is, if many devices attempt to access a server, or servers, at approximately the same time, the servers can be overwhelmed and the system can break down. Such an occurrence would be detrimental to the user experience. Controlled user base growth can also provide for additional time to test, trouble-shoot, and debug software while the software is being used by a smaller number of users.

For example, before a highly anticipate app is made available for download, hundreds of thousands of potential users may express interest in downloading and using the app. Given capacity limits of the underlying services that will be used to provide the app and related online content items to user devices, growing the user base in a managed and controlled fashion would be desirable so as to not overload the backend service components of the app. Absent managed and controlled user base growth, the backend service components might collapse under the high demand upon public release of the app or thereafter (e.g., after a favorable review by a tech journalist). A reservation system can be used to grow the user base in a controlled fashion, which can provide users that have access to the underlying software service a fast, worry-free experience. The reservation system can also provide transparency for future users who do not yet have access to the software.

Mobile-first apps, apps that are not derived from a web-based version of the product, can also particularly benefit from a reservation system as described herein. In some instances, mobile application marketplaces or stores, such as Apple® AppStoresM and Google Play8M, can impose rules or restrictions for app distribution. For example, once an app is released on an application store, it is possible that the number of app downloads cannot be controlled (e.g., due to rules or restrictions). This allows for the scenario where more users have downloaded an app than can be supported by the backend service components for the app. Regulating access to the backend service components can prevent system breakage. Managing the rate of user adoption of the app once the app is available to the general public in the application store can help alleviate the burden on backend services. Some application marketplaces may place other restrictions on apps available in the store. For example, an application marketplace might disallow an app that is not useable or functional. Reservation status functionality can be provided until the primary services are available.

Some software products use private betas that are invitation-based to seed the user base. For instance, some systems might seed the user base by allowing an initial number of users, then allowing friends of an allowed user on a social network access to the system (e.g., users who are connected to allowed users are allowed access or given invites upon request). Others might use some other criteria. For example, Facebook® seeded the initial user base by opening up the system to certain college students and then to anyone with a ".edu" email extension. Disadvantages to these systems can include lack of transparency (e.g., users are not sure when they will get access) and overhead in maintaining the invitation system (e.g., managing invitations and access).

In some embodiments of the present invention, the system distributes reservation numbers for access to a service associated with an app, for example, a primary service. A reservation number can be linked to a private code. Reservations can be requested from within the app itself, a web interface, or an email or telephone request.

The reservation data can be provided to a user. For example, the reservation number and private code can be transmitted to a user device running an app associated with the reservation system, and the app can store the received data. If the app has not been released yet (e.g., app has been publicly announced and reservations are being accepted), the reservation number and private code can be transmitted to the user in an electronic message (e.g., text message, email, etc.). This can allow the reservation system to begin to operate before the app is released to the public.

In some embodiments, the reservation numbers can be sequential. Sequential reservation numbers can allow for pre-app release publicity and viral marketing. For example, users with reservations might brag about their place in line using social media outlets before the app is even released to the public. With a sequential reservation number, users can easily tell how far back they are in the waitlist. For example, if a user has reservation number 25 (instead of 10,000, for example), the user knows that access will be granted shortly after the app is released and may brag about this.

A reservation user interface on a user device can display a number of people in front of a particular user, a number of people behind the user, and/or other information about the length of the waitlist (e.g., anticipated time when access will be allowed). Once the app is installed onto a user device, a user interface can be displayed to the user to indicate the reservation status. In some embodiments, such a user interface can be displayed every time a user opens the app until access to a primary service is granted. Displaying the status of the reservation to the user can reduce typical user attrition associated with invitation-based systems. For example, in current systems, before an app is released, the app developer may publicize the app (e.g., via social media, news release, press conference, etc.). Users interested in the software might visit a website, sign up for a beta or release version of the app, receive an email with a link, open email, and then click a link in the email. Each of these steps can have user attrition or other reasons that prevent a user from actually getting access to functionality of the app. By implementing a reservation system that works from within the app that the reservation system is used for, reservation status information can be provided to the user or push notifications can be provided almost immediately after the user is allowed access to the system.

I. Reservation System

FIG. 1 is a high-level block diagram of a system 100 according to some embodiments of the present invention. As shown in FIG. 1, a system can include a reservation system 110, one or more user devices 140, and a primary service system 170. User devices 140 can be coupled to reservation system 110 and/or primary service system 170 using network connections 102. Reservation system 110 can be used to control access to an application on a user device, such as the Mailbox app, or the backend servers for the application executing on the user device (e.g., primary service system 170). This arrangement is merely exemplary, and one having skill in the art will recognize that embodiments of the present invention can be applied to other applications and services.

The system can include a backend server infrastructure that includes reservation system 110, primary service system 170, and/or other systems or servers. The backend infrastructure can be implemented on a managed distributed computing infrastructure, a multitenant computing infrastructure, a computing cluster, or any other suitable infrastructure. The components may include various resources that act as or provide server, load balancing, queuing, caching, database, storage, or other suitable components. The backend server infrastructure can be implemented to support a client application on user devices.

Reservation system 110 and primary system 170 can include one or more server computers coupled in a network, and may be connected to other systems or server computers (not shown). Reservation system 110 can be coupled to the primary service system 170 via network connection 101. In some embodiments, reservation system 110 and primary service system 170 may be part of the same system or server.

Reservation system 110 can operate and maintain reservations for access to the primary service and can include memories or storage media for storing reservation system state data 115 and reservation data 120, a current state module 125, a reservation check module 130, and a reservation assignment module 135. The storage media for storing state data 115 and reservation data 120, current state module 125, reservation check module 130, and reservation assignment module 135 can each be in operative communication with one or more of the other modules or media. Reservation system 110 can regulate access to the primary service and/or determine when particular users are permitted to access the primary service.

Current state module 125 can be in operative communication with state information 115 and can provide information about the current state to other computing devices, such as user devices 140. Current state data 115 can include a reservation count (e.g., a total number of users currently waiting in the reservation system). For example, the total number of users in the waitlist line can be stored in memory for holding state data 115. In some embodiments, current state information includes an identifier (e.g., a sequential reservation number) for a current allowed reservation. For example, the identifier for the currently allowed user, or a currently allowed group of users can be stored. Current state data 115 can be updated periodically as the state of the reservation system changes. For example, if 100 users' access permissions are changed to "allowed," then the stored reservation count variable and stored current allowed variable can be updated. Current state data 115 can include other suitable information indicating the current state of the reservation system and associated information. For example, current state information can include a total number of users that have been allowed (e.g., removed from the waitlist line).

In some embodiments, reservation system 110 includes a memory for storing reservation data 120 of users with reservations. Reservation data 120 can include a table or database of user reservations. In some embodiments, reservation data 120 can include a reservation identifier (e.g., a reservation number) and data associated with that particular reservation identifier. In some embodiments, the data can include an authentication code for authenticating a user or a device associated with the reservation. Additional data that can be stored as reservation data is described below.

Reservation check module 130 can determine whether a user with a reservation is permitted to access the primary service. In some embodiments, reservation check module 130 can be in operative communication with the storage for reservation data 120 and/or current state module 125. Reservation check module 130 can receive current state information from current state module 125 and compare it with reservation data received from a particular user device 140. The reservation check module can determine if the particular user device 140 is associated with an allowed reservation. If the reservation data received from a particular device indicates that the reservation is allowed (e.g., if the sequential reservation number is less than or equal to the current allowed sequential reservation number), the reservation check module can modify information associated with the reservation so as to allow access to the primary service (e.g., change an "Allowed Flag" in the reservation data 120).

Reservation assignment module 135 can generate a reservation and/or assign a reservation to a user account, user device, or a device. Reservation data 120 can be updated to reflect newly assigned reservations. New reservations and related information can be transmitted to users. In some embodiments, new reservation data is transmitted to a user device 140 (e.g., to a user-installed app on the device). In some embodiments, new reservation data is transmitted to a user in an electronic message, such as email, text message, or the like.

User devices 140 can include any user computing device including a phone, tablet, laptop computer, desktop computer, mobile computing device, connected TV computing device, or any other suitable computing device. User devices 140 can execute one or more client applications or apps. In some embodiments, the client application provides access, or services related, to serving content items from a remote server. In some embodiments, the application has a predefined action that can be activated or unlocked using reservation system 110. The predefined action can be using the application to access a network-based service or permitting setup of a user account for a network-based service. Any suitable predefined action can be activated.

User devices 140 can include one or more software and/or storage modules including device (or account or user) reservation data 150 and reservation system state data 160. These modules can store information about the status of a reservation. Reservation data 150 includes reservation data that is specific to a device, user account, and/or user of the device or user account. Reservation system state data 160 includes information about the current (or last received) state of the reservation system 110.

Device reservation data 150 can include information about the status of a particular reservation associated with the user device or a user account. In some embodiments, device reservation data 150 can include a reservation identifier, a reservation authentication code, and/or other data. In some embodiments, device reservation data 150 includes a sequential reservation number and an alphanumeric reservation authentication code. Other possible device reservation data 150 is described below.

Device reservation data 150 can be received by user device 140 from reservation system 110. In some embodiments, device reservation data 150 can be generated by reservation assignment module 135. Device reservation data 150 can be received by an app executing on user device 140. In some embodiments, user device 140 can receive the device reservation data 150 from user input on the user device. For example, a user can receive reservation data via an electronic message, and the user can enter reservation data into an app running on the user device or otherwise provide the reservation data to the user device.

Reservation system state data 160 can be received by user device 140 from reservation system 110. In some embodiments, some or all of reservation system state data 160 can be generated and/or transmitted by current state module 125 and can include a current allowed reservation and/or a total number of reservations in line. In some embodiments, reservation system 110 can transmit updated current state information on a periodic basis determined by reservation system 110 and/or user device 140. In some embodiments, the periodic basis is a predetermined interval when an app is executing in the foreground. In some embodiments, reservation system 110 can transmit updated current state information in response to a request by user devices 140. In some embodiments, reservation system 110 transmits current state information whether or not a request is received. User device 140 can store the received state information so that the user device knows the current (last known) state of reservation system 110 at a given point in time even if network access is currently unavailable.

The storage media for device reservation data 150 and reservation system state data 160 can be in operative communication with one or more software modules, including a position module 162, a reservation user interface module 164, an allowed check module 166, and/or an application user interface module 168. Other modules can be included. Any one of these modules can be in operative communication with one another and/or other storage medium on the user device.

Position module 162 can calculate a current position of the user on a waitlist. In some embodiments, position module 162 receives device reservation data 150 and reservation system state data 160 and calculates a current position on a waitlist. In some embodiments, position module 162 can poll the reservation system 110 on aperiodic basis or as requested based on user actions. The current position can include a number of users in front of the user, a number of users behind the user, and/or a total number of users in the waitlist. For example, a number in front of the user can be calculated using a sequential reservation number associated with the user's the reservation (provided by device reservation data 150) and a sequential reservation number associated with a current allowed reservation (obtained from reservation system state data 160). In another example, a number behind can be calculated using the total number of accounts currently in the waitlist and a sequential reservation number of the reservation.

Reservation user interface module 164 can generate and/or display the waitlist position on the user device 140. In some embodiments, reservation UI module 164 is in operative communication with position module 162. Reservation UI module 164 can generate animation for display. In some embodiments, the animation is based on two or more previously calculated positions on the waitlist. For example, if the number in front on the waitlist was 10,000 at a first time (e.g., last time the user used the app) and 8,000 at a second time (e.g., the current time), reservation UI module 164 can generate an animation that counts downward from 10,000 to 8,000. Animating the countdown can provide visual feedback to the user and can enhance the user experience by indicating the progress in the waitlist. This can reduce user attrition.

Allow check module 166 can locally check whether or not the user is allowed to use primary service system 170 based on a reservation associated with the user. In some embodiments, when a sequential reservation number associated with the user device is less than or equal to the current allowed reservation stored in reservation system state data 160, the user is allowed to access or utilize the primary service. Allow check module 166 can perform this check on a periodic basis, as requested by a user, and/or when updated state information is received from current state module 125. When access is allowed, the reservation user interface may cease being displayed and the primary app user interface can be displayed.

Primary app user interface module 168 can generate, and cause to be displayed, a primary user interface for an app running on the user device. Primary app user interface(s) are the user interfaces that are used to access information and functionality provided by the app. A primary app UI 168 can be any application user interface other than the reservation system UI module 164. Primary app UI 168 can be used, for example, to create or initialize an account using the app or use features of the app. An example of a primary app UI is described below. One having skill in the art will recognize that there are many other examples of primary app user interfaces.

Primary service system 170 can include one or more servers coupled together in a network. Primary service system 170 can provide the backend processing for the primary service. In some embodiments, the primary service is a service that serves and/or manages content for a user (e.g., an email or to do list service). However, it is understood that any client app on a user device that provides or relies on network services are contemplated within the scope of the disclosure (e.g., social applications, shopping applications, game applications, productivity applications, and the like). Primary service system 170 can include a check access module 175, an account create module 180, one or more primary service modules 190, and various account data 195.

Check access module 175 can check whether a user account or user device is permitted to access the primary service system 170. In some embodiments, check access module can perform similar verification to reservation check module 130. Primary service 170 can store a copy of any or all of the data in reservation data 120, or be in operative communication with reservation system 110 to obtain reservation data 120.

Account create module 180 can be used to create or initialize an account associated with the primary service. For example, in the case of Mailbox, account create module 180 can be used to set up an email account for use in the Mailbox app. One having skill in the art will recognize that many other account setups and/or initializations can be performed using account create module 180.

Primary service module 190 can be used for providing the primary services. For example, in the case of Mailbox, primary service module 190 can be used for analyzing and delivering email to a user device. One having skill in the art will recognize that many other primary services can be provided by primary service module 190. Account data 195 can store information associated with the primary service, including user data and user preferences.

Figure 2:
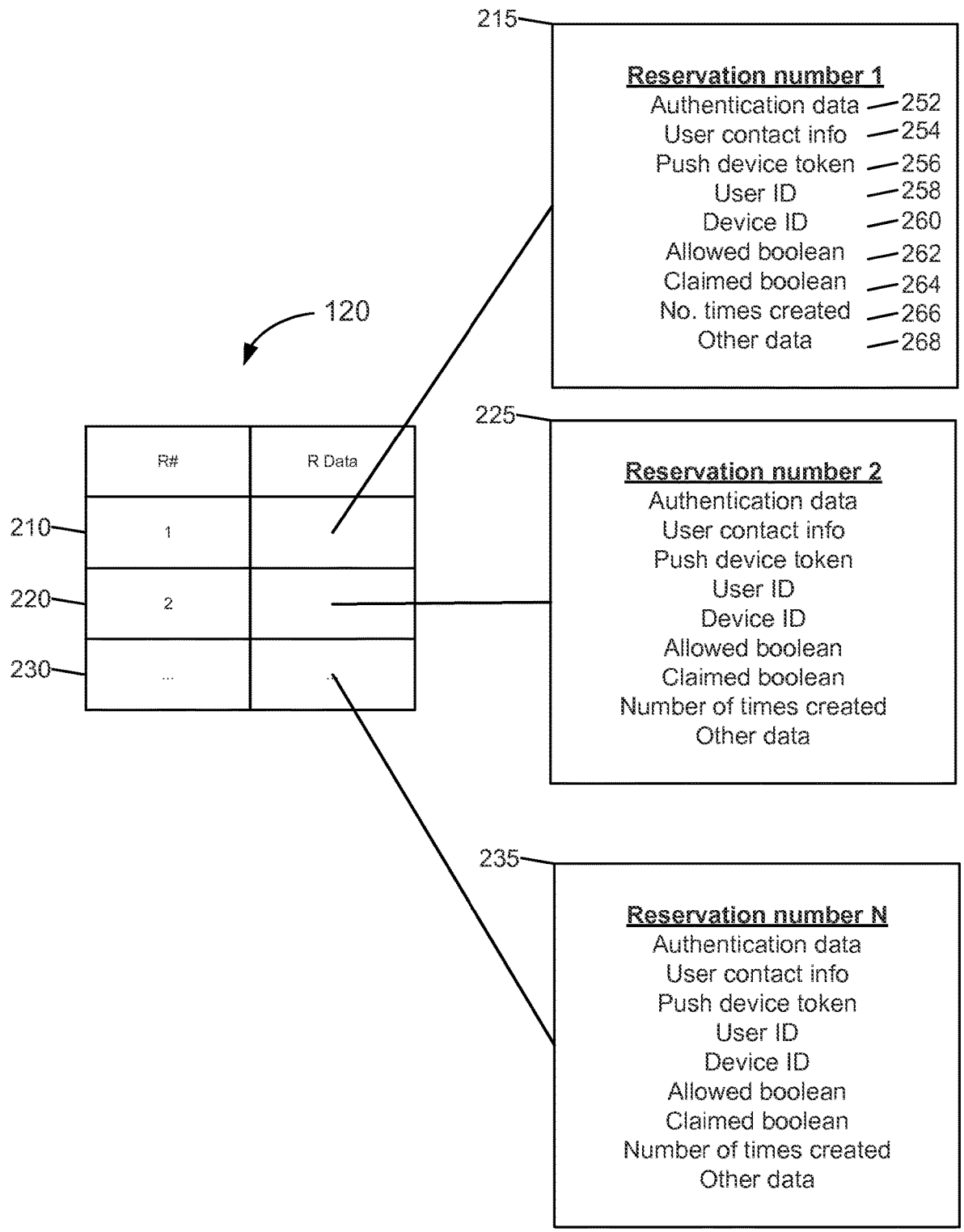
FIG. 2 shows a table of reservation data in accordance with some embodiments of the present invention.

FIG. 2 illustrates a table of reservation data that can be used in accordance with some embodiments of the present invention. In particular, FIG. 2 shows an expanded view of information that can be stored as part of reservation data 120 (FIG. 1). FIG. 2 shows one potential implementation of data that can be stored; one having skill in the art will recognize that variations are contemplated within the scope of the present invention.

Reservation data 120 can include a data entry for each reservation number, which can be a sequential reservation number as shown in FIG. 2. For example, reservation data 120 can include an entry 210 for reservation number 1, an entry 220 for reservation 2, and so on. Each entry can have a reservation record associated with it. For example, reservation entry 210 can have reservation record 215 associated with it, and reservation entry 220 can have reservation record 225 associated with it. Each record can include one or more of the following: a reservation number, authentication data (252), user contact information (254), a push device token (256), user identifier (258), device identifier (260), allowed boolean (262), claimed boolean (264), number of times created variable (266), and/or other data (268).

Authentication data 252 can include any suitable data for authenticating a user, user account, user device, and/or reservation number. Authentication data can include an alphanumeric code, user data (email address, phone number, etc.), information based on what the user knows, such as passwords, passphrases or other challenges (e.g., name of user's high school), biometric information, or the like. In some embodiments, authentication data 252 can include a 4-character code. In some embodiments, authentication data 252 can be generated by the reservation system, transmitted to the user, and the user can then provide all or part of the authentication data 252 back to the reservation system or system in communication with the reservation system.

User contact information 254 can include any suitable data, addresses, or identifier used to contact the user. For example user contact information can include a phone number, email address, user account ID (e.g., for a social media user account), or the like.

Push device token 256 can be used to transmit a push notification to a user device. A push device token can be received from a push notification service such as Apple Push Notification Service. This token can be used to provide a push notification to the user. For example, in some embodiments, user permission to provide push notifications to the user can be requested by an app. If the user grants permission, the app can contact the notification server for a push device token.

User identifier 258 can include a name, user name, or any other suitable information to identify a user. Device identifier 260 can include any suitable identifier for uniquely identifying a specific user device. For example, device identifier 260 can include a serial number, International Mobile Station Equipment Number (IMEI), electronic serial number (ESN), or the like.

Various boolean variables (e.g., allowed boolean 262 and claimed boolean 264) can be included in a reservation record (e.g., 215, 225, 235). These can be used for security checks to verify that a reservation is allowed. In some embodiments, an allowed boolean 262 is provided to indicate whether a user associated with a particular reservation number is permitted access to the primary service. For example, allowed boolean 262 can have a TRUE value when the user is allowed access or FALSE value when the user is not allowed access. In some embodiments, allowed boolean 262 for a reservation is initially set to FALSE when the reservation is generated. In some embodiments, allowed boolean 262 can be changed to TRUE when access is allowed, e.g., once the user's reservation number becomes allowed. In some embodiments, allowed boolean 262 can be changed to TRUE if it is desired to allow access to a user out of order.

In some embodiments, claimed boolean 264 can be used to indicate whether or not a reservation has been claimed. Claimed boolean 264 can be used to preventusers from using the same reservation multiple times to get access to the primary service. For example, it can be desirable to prevent one user from providing an allowed reservation to a third party to use. In some embodiments, when a reservation is created, claimed boolean 264 is set to FALSE. In some embodiments, the reservation system changes claimed boolean 264 to TRUE when a reservation is claimed (e.g., used for the first time to access the primary service). In some embodiments, once claimed boolean 264 is TRUE, the reservation cannot be used again to access the primary service.

In some embodiments, multiple devices belonging to, or under the control of, a single user can be permitted to access the primary service when the reservation associated with that user becomes allowed. For example, a user account identifier (or token) can be used to permit a user to access the primary service from more than one device (e.g., smart phone, tablet, portable computer, desktop computer, etc.) using the same reservation. For example, a reservation can be used to access the primary service from multiple devices if the same account identifier or token is sent from each device.

Number of times created variable 266 can be used to set a limit on the number of times that an allowed reservation can be used to create or initialize an account with the primary service. In some embodiments, a threshold number can be set (e.g., 1, 5, 10, etc.). An allowed reservation can be used for up to the threshold number to create or initialize an account with the primary service. For example, in some embodiments, once a reservation is allowed a user can create an account. In some embodiments, account initialization and/or creation is allowed for a predetermined threshold number of times. This can be used to prevent user circumvention of the reservation system.

Other data 268 can be associated with each reservation. The examples of reservation record data provided herein are exemplary in nature, and one having skill in the art will recognize that some data may be omitted and/or other data can be provided.

II. Reservation Methods

Figure 3:
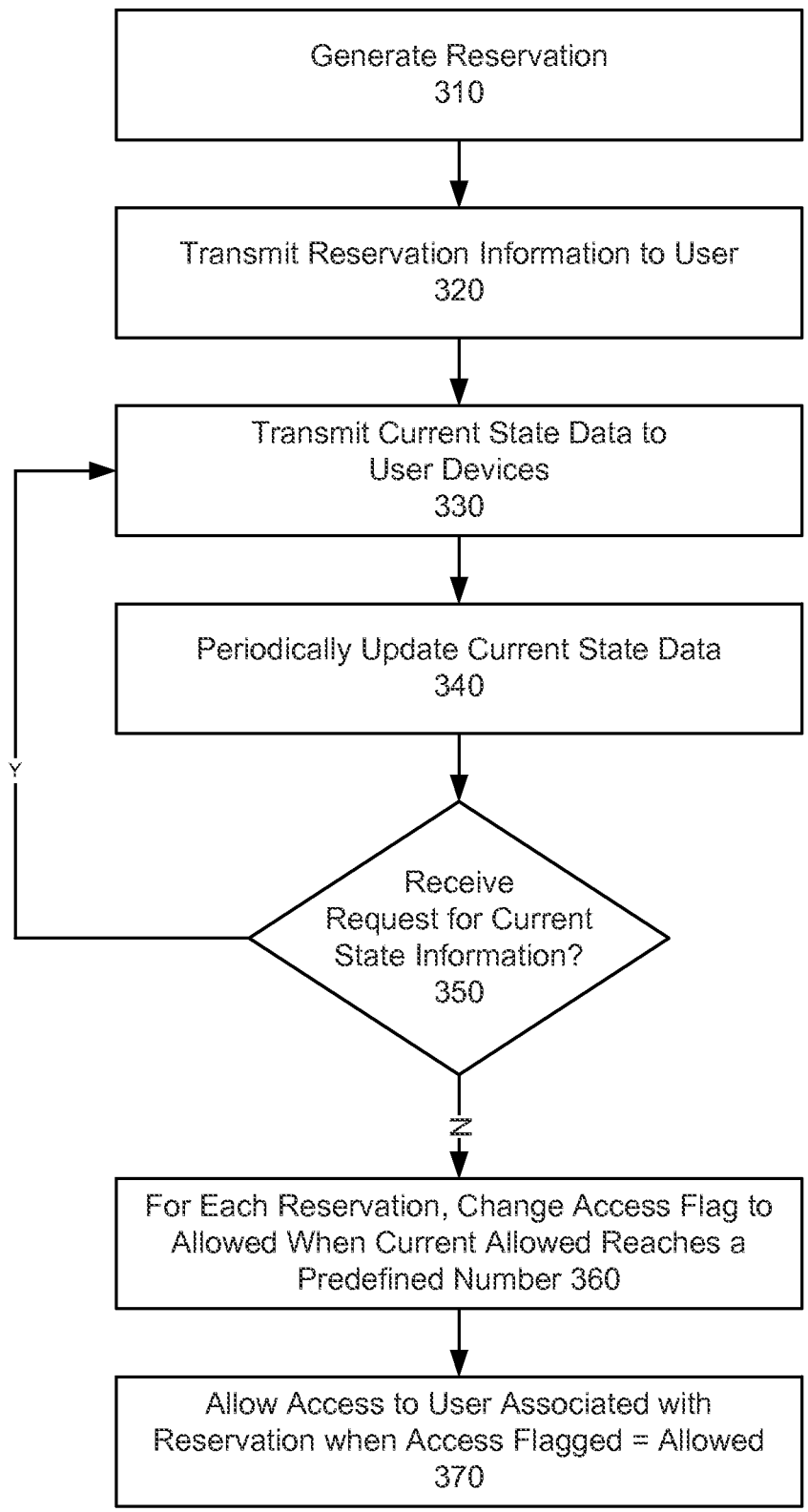
FIG. 3 shows a method that can be performed by a reservation system in accordance with some embodiments of the present invention.

FIG. 3 shows a high-level process flow according to certain embodiments of the present invention. In some embodiments, a method 300 can be performed in whole or in part by reservation system 110 and/or primary service 170. Method 300 can include generating a reservation (310), transmitting reservation data to a user device (320), transmitting current state data to user devices (330), periodically updating current state data (340), receiving a request for current state information from one or more user devices (350), changing access permissions associated with reservations as appropriate (360), and allowing access to a primary service when conditions are met (370). These blocks will be described in more detail below.

At block 310, a reservation can be generated or assigned in response to a user request. For example, reservation assignment module 135 can generate or assign the reservation. In some embodiments, a reservation can be generated in response to a user request. In some embodiments, reservations can be generated in blocks (or all at once) and can be assigned in response to a user request. Certain embodiments of a user request for a reservation are described below.

In some embodiments, a reservation is associated with reservation information or data, which can include a reservation number and an authentication code. In some embodiments, reservation numbers can be sequential numbers. Reservation numbers can start at a predetermined number and can be ordered in time. For example, the first reservation number could be 101, the second reservation number could be 102, and so on. Any other suitable starting reservation number could be used. Sequential reservation numbers can provide user transparency. With sequential reservation numbers, users can be aware of their overall position in line without anything more than knowing their sequential reservation number. This can provide publicity benefits in a period before an app is released. For example, a user who is first in line (or another favorable position) for a widely-anticipated app might announce this favorable position using social media.

In some embodiments, reservation numbers can be randomly generated (e.g., non-sequential numbering). For randomly generated, non-sequential reservations numbers, the reservation number can be linked to an order in the waitlist. In this instance, the order and overall position in the waitlist may not be immediately known to the user. In some embodiments, a random number can be used as both the reservation number and the private code. In this instance, the random number can be linked to a sequential ordering in the waitlist.

In some embodiments, an authentication code can be associated with, or linked to, a reservation number. The authentication code can be used for security purposes to verify a reservation number. For example, in the case where reservation numbers are sequential, an unauthorized user might be able to hack a device to provide an allowed reservation number and access the service out of turn. In this circumstance, the authentication code can be used to prevent this access since the unauthorized user will not have the proper authentication code.

In some embodiments, the authentication code can be a 4-character private code. The private code can be randomly generated from a set of available characters. In some embodiments, the authentication code can be a user email address or a user phone number. In some embodiments, the authentication code can be other user data (e.g., address, user-selected password, number, identifier, or the like).

Other information can be substituted for the authentication code. Authentication can be based on any combination of what the user knows, what the user has, or what the user is. For example, authentication information based on what the user knows can include passwords, passphrases or other challenges (e.g., name of user's high school). Authentication information based on what the user has can include physical objects that identify a user based on the user's demonstrated possession of an object (e.g., key fobs, smartcards, token stored on a user device, etc.). Authentication information based on what the user is can include DNA, fingerprints, retinal scans, voice identification, cadence of typing, walking, talking, and other biometric identification methods.

Sequential reservation numbers and/or an authentication codes can promote user privacy and anonymity, reduce overhead required for operating and maintaining the reservation system, and/or provide an easy-to-use, frictionless experience for the user. Operating and maintaining invitation systems that use an email link registration method can be burdensome. In some embodiments of the present invention, a reservation system can be implemented without maintaining a list of reservation identifiers linked to email addresses or other user data.

At block 320, the reservation system can transmit reservation data to a user device. In some embodiments, a reservation number and an authentication code can be transmitted to a user device in an electronic message (e.g., email, text message, instant message, or some other electronic message). The reservation number and authentication code can be transmitted in the same message or in separate messages. In some embodiments, reservation data can be transmitted to a web browser. One having skill in the art will recognize that there are other possibilities for transmitting reservation data communicated to the app using a protocol or message format that is understood by the app.

At block 330, the reservation system can transmit current state data to user devices. As described above, current state data can include a reservation count and current allowed reservation. For example, the server can determine the reservation count and current allowed (from current state data 115 in FIG. 1) and send this information to the user device (user device 140 in FIG. 1). In some embodiments, the reservation system transmits current state data to user devices in response to requests from respective user devices. In some embodiments, the reservation system can transmit current state data periodically, e.g., on a predetermined or variable interval. Regardless of which unique devices receive current state data from the reservation system, the reservation system can transmit the same current state data variables. For example, if device A and device B request current state data at approximately the same time, the reservation system can return the same current state data to each device and is not required to lookup device-specific information.

At block 340, the reservation system can periodically update current state data. For example, the current state data 115 in FIG. 1 can be updated. In some embodiments, the reservation system can decide to allow a predetermined number of users access to the primary service, additional users may have requested reservations since the last update, and current state data 115 can be updated by increasing the current allowed reservation number by the predetermined number of users. In some embodiments, current state data 115 can also be updated by increasing the line total by the number of additional users.

In some embodiments, the reservation system can decide to allow a predetermined number of users access to the system over a predetermined amount of time. For example, the system could allow 1000 users access to the system over a 1-hour period. In this example, if the previous allowed reservation was reservation number 500, then the current state data can be updated to indicate that the current allowed is 1500. In some embodiments, access to the predetermined number of users can be granted on a rolling basis (e.g., spread out over the 1-hour period). For example, approximately 17 users could be allowed each minute for one hour so that approximately 1000 users were allowed in the hour period. The access permission can be updated on a rolling basis as well. This can prevent a surge in processing resources needed by the backend service components.

At block 350, the reservation system can receive a request for current state information from one or more user devices. When a request is received, the reservation system can return to block 330 and transmit current state data. Requests from a user device can occur when a client application on the user device is executing in the foreground or the background. In some embodiments, the state data is transmitted whether or not a request is received from a user device.

At block 360, the reservation system can change access permissions associated with reservation data records as appropriate. In some embodiments, the reservation system can change the values stored in the table shown in FIG. 2. For example, reservation system can change the value for allowed boolean 262 when a reservation is allowed. For example, referring to the example above, the allowed boolean associated with each of reservations numbers 501-1000 can be changed from FALSE to TRUE in response to those reservations becoming allowed.

At block 370, the reservation system can allow access to a primary service when conditions are met. For example, reservation check module 130 can determine whether conditions are met. In some embodiments, check access module 175 can check whether conditions are met. In some embodiments, allowed users or user accounts can be notified using a client app running on the user device. For example, a message can be displayed in the app and/or the user interface can change from a reservation countdown screen to an account setup screen. In some embodiments, allowed users or user accounts can be notified using a push token. For example, if a reservation is allowed when the application is not running in the foreground, a push notification can be provided to the user device. An allowed user or user account can then be granted access to a primary service system (e.g., primary service system 170 in FIG. 1). In some embodiments, the reservation system can change claimed boolean 264 from FALSE to TRUE responsive to the user associated with an allowed reservation actually accessing the primary service system.

Figure 4:
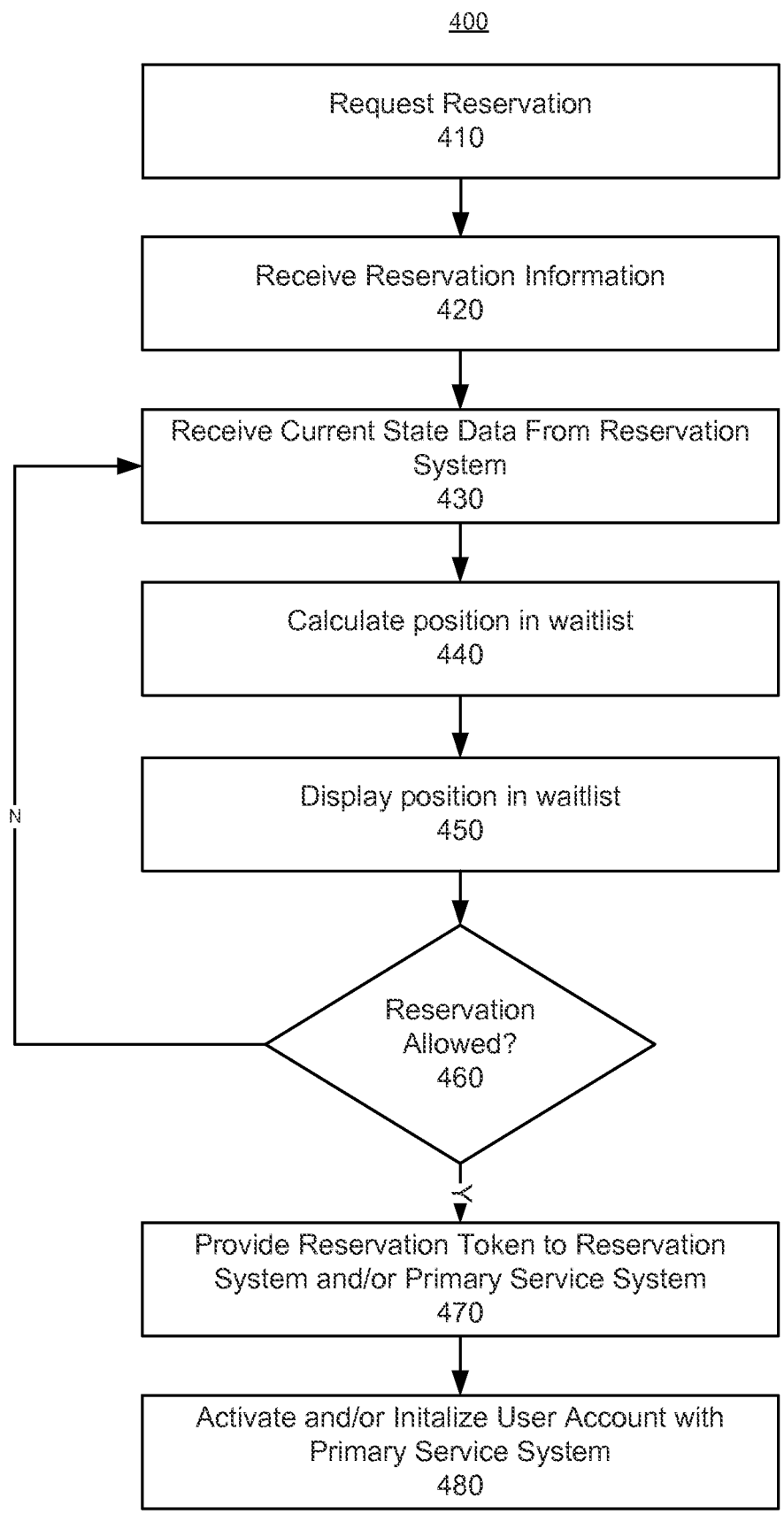
FIG. 4 shows a method that can be performed by a user device in accordance with some embodiments of the present invention.

FIG. 4 illustrates a high-level process flow according to certain embodiments of the present invention. In some embodiments, a method 400 can be performed in whole or part by a user device 140. Method 400 can include requesting a reservation (410), receiving reservation data (420), receiving current state data from reservation system (430), calculating position in a waitlist (440), displaying position in a waitlist (450), determining whether a current allowed reservation is allowed (460), providing at least a portion of the reservation data to the reservation system and/or the primary service system (470), and activating and/or initializing user account with primary service system (480). These blocks will be described in more detail below.

At block 410, a user can request a reservation. In some embodiments, the user request is received using an app running on a user device, and the app can be the subject of the reservation system (e.g., a mobile app-initiated reservation request). In some embodiments, a request for a reservation can be made through email or other suitable electronic message. Reservation requests initiated using methods other than through the app which is the subject of the reservation system can be useful, e.g., during a pre-app release period.

In some embodiments, the request is received through a web portal, such as a webpage. In some embodiments, a web reservation request system is used only before the app is released and the app-initiated reservation request is provided. For a reservation request initiated using the web, a web interface can be provided. The interface can include data fields for entering in user contact information, such as a phone number, email address, or the like. The contact information can be used to provide reservation data to the user. Requesting user or device identifying information, such as a phone number or email address, can help to ensure that any given user is not requesting multiple, or too many, reservations. For example, for a popular app, someone might "hoard" spots in line and attempt to sell their space.

For example, the user can enter a phone number in order to receive an electronic message with a sequential reservation number and a private code. In some embodiments, the message can be a text message or an instant message service. In some embodiments, there can be a button on the web interface to request a reservation number and responsive to selecting that button the reservation number and private code can be displayed on the screen (instead of email/phone receiving a message).

At block 420, a user device can receive reservation data. In some embodiments, e.g., where the user obtained a reservation via text or email message or web interface, the reservation data can be received via a user manually entering in reservation data into an app running on a user device. In some embodiments, the reservation data can be received by the user device from the reservation system (e.g., an electronic message can be transmitted from the reservation system to the user device). In some embodiments, the reservation data can otherwise be sent to the app running on the user device.

At block 430, a user device can receive current state data from the reservation system. In some embodiments, the user device polls the reservation system server at a predetermined interval when the app is running in the foreground or background. For example, the user device can request updated data (e.g., total number in line and current served) every 5 seconds. Any suitable period of time can be used. In some embodiments, the reservation system can transmit updates on a periodic basis.

At block 440, a user device can calculate the user's position in a waitlist. In some embodiments, any given user device knows its own reservation number (received at block 420), a total number of people waiting in system (from state data 115), the reservation number being currently served (from state data 115). From these numbers, the user device can determine the number of people in front of the user (e.g., Your_R#-Currently_Served_R#) and/or the number of people behind the user (Length_of_Waitlist-Number_In_Front).

In some embodiments, the calculation is performed locally on the user device. Local device-side calculations can cause less server burden. In some embodiments, a server needs to provide only limited information that is the same for all users or devices. This can void database calls to look up user-specific data such as the particular user's reservation number, further reducing the load on the server. For example, at a given time, any user device that polls the server can request the current state data. At that given time, any and all devices can receive the same data, and the data can be non-device-specific and/or non-user-specific. The load on the server for providing non-device-specific or non-user-specific can be low.

On each device, computation of each user's position in line is distributed amongst specific user devices. Each user device can calculate locally the number of user accounts behind and in front, and the like. Because the calculations can be relatively simple, they can be performed by the user device quickly and efficiently. This further can reduce the processing load of the server.

At block 450, a user device can display the user's position in a waitlist on a display. In some embodiments, the position is displayed using a countdown user interface. In some embodiments, the countdown user interface displays one or more of the following: current reservation number served, user's number in front, user's number in back, or reservation count. In some embodiments, the position is displayed graphically.

In some embodiments, the countdown user interface can be animated. In some embodiments, the user device can maintain a current reservation system state data and a previous reservation system state data. A rate of change can be extrapolated using the current and previous reservation system state data, and that rate of change can be applied to an animation. For example, the user device can store the state data from the last two times that the user device received an updated state from the server and can determine a difference between those two values. The difference between the two state values, and the difference in times associated with the two values, can be used to calculate an animated speed. Animated numbers can make the countdown appear to be "real-time" when actually there may be a slight delay. These displayed numbers can decrement and increment in real-time or near-real-time, so the user can see the line decreasing in front of the user and/or increasing behind the user.

For example, in some embodiments, a user device polls the reservation system every 5 seconds when the app is running. If 10 users were allowed into the system in the last 5 seconds, then the "number in front" display can be animated over the next 5 seconds to reduce by 10 (at 2 per second). Then, when the animation is completed, the app can already have the "next" current state information and generate another animation. The user can see a continuous animation on the device when users are being added to the service.

In some embodiments, there can be a long period of time between two app uses (e.g., opening an app to use it, closing it, and then reopening it). In some embodiments, an app only polls the reservation system when app is open and/or running in the foreground. Therefore, if the app has not been opened up in a relatively long time (e.g., 1 day, 1 week, etc.), when the app opens, it can poll the server to get updated numbers. It is possible that the current state and previous state numbers will be vastly different. In some embodiments, the animation will show the progress in the waitlist from the last time the app was opened through the present time. For example, the countdown may move at an accelerated pace (e.g., faster than "real-time") similar to a time-lapse video. In some embodiments, state information from the last time the app was open and current state is animated over a predetermined time that is orders of magnitude shorter than the difference in time between when the app was last opened and the current time. For example, if the app had not opened in 1 day, the change in state data over that one day may be animated over a much shorter period, e.g., 5 seconds or 10 seconds. Not polling the server in the background, and instead animating the reservation status numbers displayed when the app is in the foreground, can provide visual feedback to the user, which can be very gratifying from a user perspective, while reducing power consumption and data usage incurred by running apps in the background. In some embodiments, an app on the user device can poll the server in background. This can keep the user device updated with data. However, it may decrease battery life and increase data usage.

At block 460, the user device can determine whether a reservation is allowed. For example, allowed check module 166 can perform this check. In some embodiments, the threshold is whether the user's reservation number is less than or equal to the current served reservation number. Other thresholds can be used.

At block 470, the user device can provide at least a portion of the reservation data to the reservation system and/or the primary service system for verification. For example, when the device thinks it is allowed (e.g., when R#<Current served), the user device can send the reservation number and the private code to the server. The server can then check to confirm that the ALLOWED variable is TRUE, as an extra check to ensure access is allowed.

At block 480, the user device can then display a user interface for activating and/or initializing user account with primary service system. An example of such a user interface is shown below.

It will be appreciated that processes 300 and 400 are illustrative and that variations and modifications are possible. Blocks described as sequential may be executed in parallel, order of blocks may be varied, and blocks may be modified, combined, added, or omitted. Some blocks are identified as being performed by a specific system, device, or module, but it is understood that alternatives are possible.

III. User Interfaces

FIGS. 5-8 show various user interfaces that can be displayed on a user device in accordance with certain embodiments of the present invention.

Figure 5:
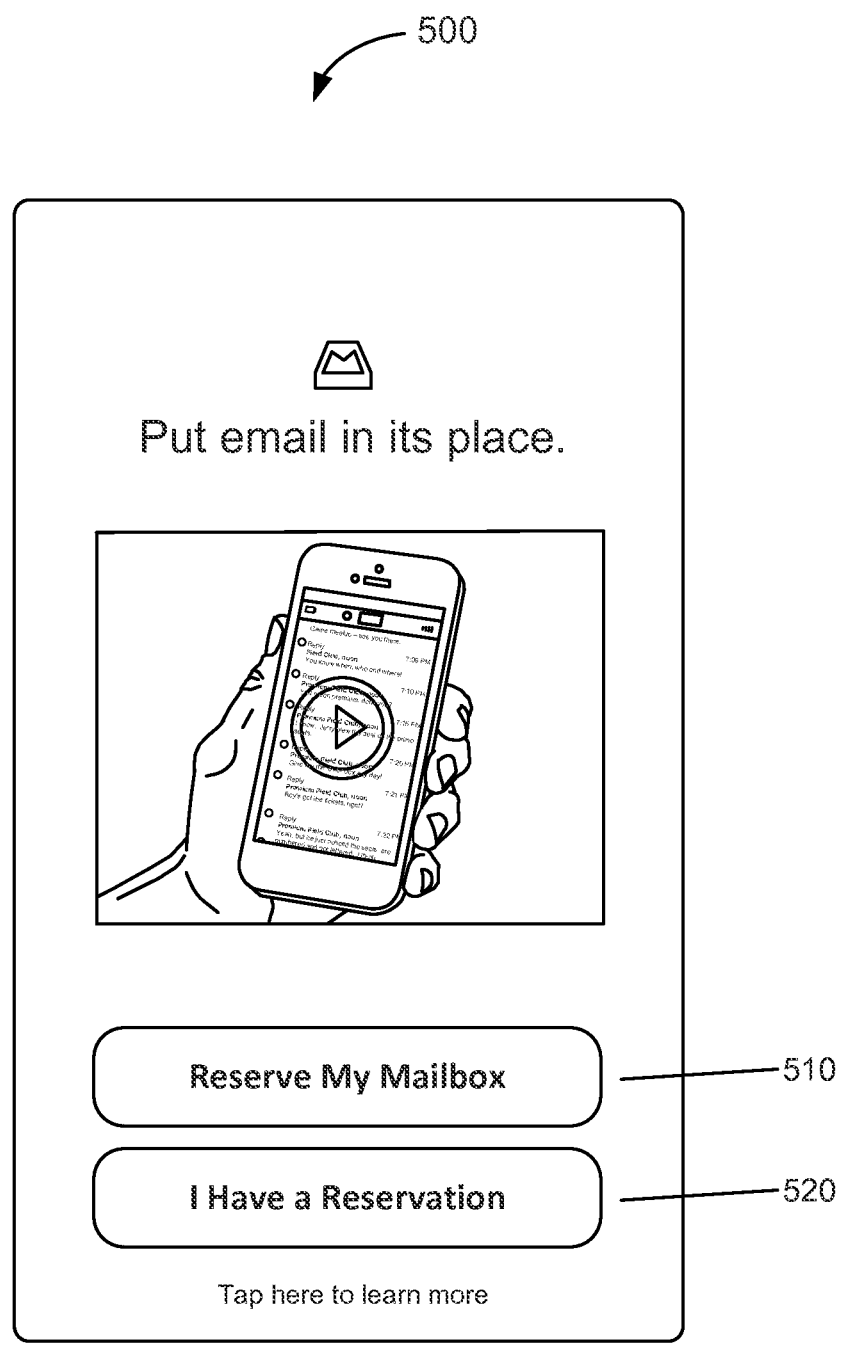
FIG. 5 shows a user interface that can be displayed to request or provide a reservation in accordance with some embodiments of the present invention.

FIG. 5 shows a user interface 500 that can be displayed when an application is first opened on a user device. The user interface can include one or more buttons, including a get reservation button 510 for users that do not have a reservation and an enter Reservation info button 520 for users that already have a reservation. Responsive to a user selecting button 510, the user device can display reservation status data on the display (e.g., FIG. 7). In the background, the user device can transmit a request for a reservation, the server can generate or assign a reservation, and the user device can receive reservation data before the user device displays reservation status data. In some embodiments, if a user accidentally selects button 510 when the user in fact already has a reservation, there may be a user interface option to go back and enter in a previously assigned reservation. Responsive to a user selecting button 520, another user interface can be displayed (e.g., FIG. 6). The user can select button 520 when the user has a reservation already. For example, the user may have received a reservation after using a web interface, described above.

Figure 6:
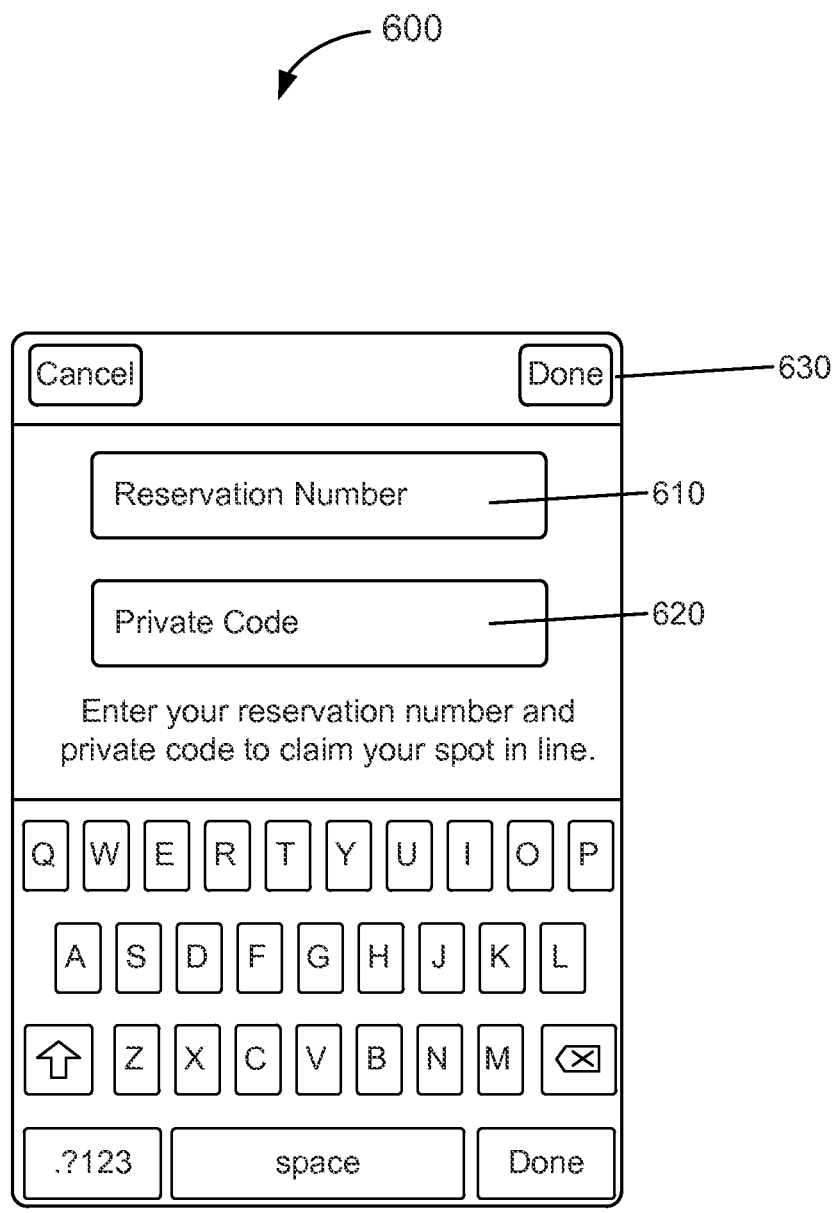
FIG. 6 shows a user interface that can be displayed to provide reservation data in accordance with some embodiments of the present invention.

FIG. 6 shows a user interface 600 that can be displayed for entering in existing reservation data in response to selection of button 520 in FIG. 5. User interface 600 includes fields for receiving user input. Reservation number input field 610 can accept, from a user, a reservation number that was received by the user (e.g., received in an electronic message after a signup or registration process). Private code input field 620 can accept, from a user, a private code to authenticate the reservation number and/or user. Responsive to a user selection of the "done" button 630, the user device can transmit the reservation number and/or private code to the reservation system or the primary service system to authenticate the data or user. If the reservation is allowed, a primary service UI (e.g., FIG. 8) can be displayed. Otherwise, a reservation countdown UI (e.g., FIG. 7) can be displayed.

Figure 7:
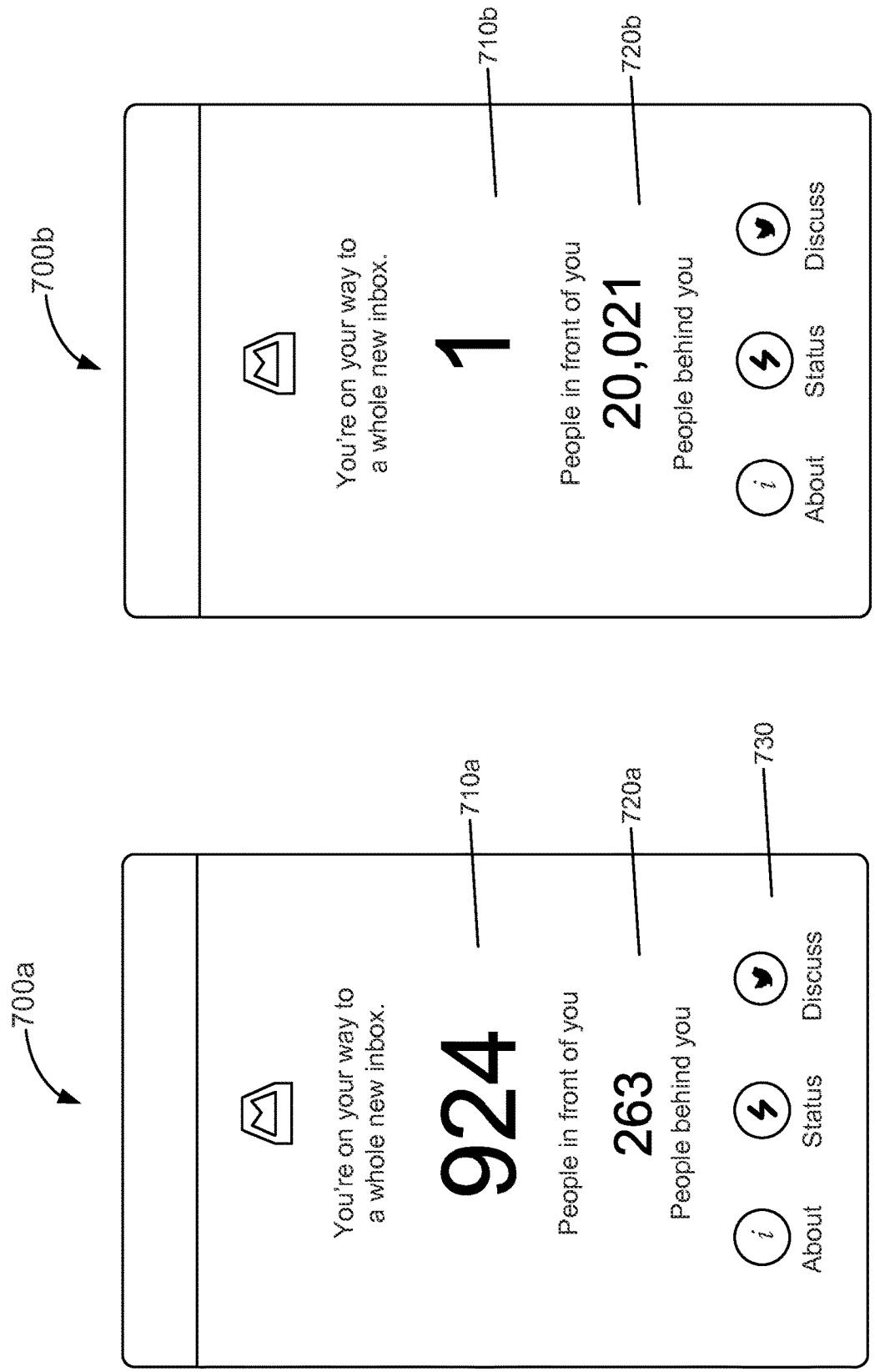
FIG. 7 shows user interfaces that can be displayed to indicate a position in a line in accordance with some embodiments of the present invention.

FIG. 7 shows user interfaces 700*a* and 700*b* that can be displayed after the user device receives reservation data for the particular user and/or device. UIs 700*a* and 700*b* can be used to indicate a place in the line. UI 700*a* represents the reservation status at a first time, and UI 700*b* represents the reservation status at a second time after the first time. In some embodiments, a number in front 710*a* or 710*b* is displayed. In some embodiments, a number in back 720*a* or 720*b* is displayed. In some embodiments, a reservation count (not shown) is displayed. In some embodiments, a current reservation number served (not shown) is displayed. Other information indicating the status of the reservation associated with the user device can be displayed without departing from the scope of the present invention.

In some embodiments, the position is displayed graphically. For example, a visual or graphical representation of the waitlist (e.g., progress bar) could be used to display the position in the waitlist. Visual or graphical representation can be used to hide or obscure the actual system volume (e.g., from competitors) while still giving users an indication of progress in the waitlist.

In some embodiments, other information can be displayed, and other buttons or links can be provided on UIs 700*a* and 700*b*. For example, "About" button can link to a page in the app with more info; "Status" button can link to a status blog, and "Discuss" can link to a hashtag on social media enabling the user to quickly disseminate their position in line using social media.

Figure 8:
FIG. 8 shows a user interface that can be displayed after a reservation is allowed in accordance with some embodiments of the present invention.

FIG. 8 shows a user interface 800 that can be displayed when user is allowed to access the primary service. In some embodiments, once the user is allowed access to the full feature set of Mailbox the reservation UI disappears. In some embodiments, once the user is allowed access to the full feature set of Mailbox the UI 800 is displayed. UI 800 allows user the ability to add email accounts and start using the Mailbox app. UI 800 can also be the first screen display to a user when the reservation system is no longer needed. The reservation system might no longer be needed when there is no longer a waitlist and/or when no further software beta testing is needed.

IV. Computer Systems

Figure 9:
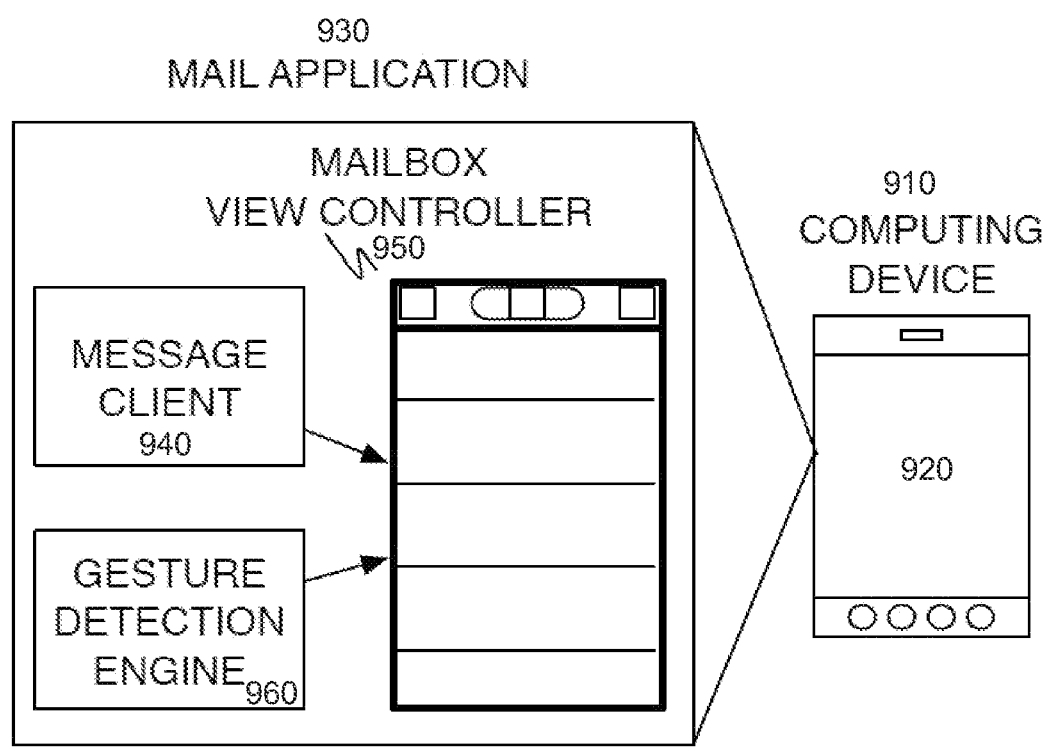
FIG. 9 shows an example of a primary service that can be provided by a primary service system on a user device in accordance with some embodiments of the present invention.

FIG. 9 shows one example of a primary service that can be provided by an app running on a user device (e.g., 140) along with a primary service system (e.g., 170). As shown in FIG. 9, a system for organizing messages can include a computing device 910 with a display 920 and an application 930 including a message client 940, a mailbox view controller 950, and a gesture detection engine 960. The system can function to render an interactive interface for sorting and managing messages of a mailbox. The system can enable users to quickly and intuitively manage email through a gestural interface. The system can provide a mailbox organization configuration that is managed through gestures applied directly to messages. The system can be configured for interfacing with an email account, but may alternatively or additionally be used with alternative information streams such as social network messaging, news streams, task lists, or any suitable updated collection of information.

The computing device and display can function to process and render the interface for a user. The computing device can be a mobile device such as a smart phone, but may alternatively be a tablet, a desktop computer, a gaming system, a TV-connected computing device, a wearable computing device, or any suitable computing device. The device can input an input device capable of detecting gestural input. In some embodiments, the input device is a touch screen, but may alternatively be a user motion detection system, device motion sensors, a cursor positioning device (e.g., a mouse or trackpad), or any suitable input device.

The message client can function to manage the sending, receiving, and manipulation of messages. The message client can communicate with a server of message service provider, server of a mailbox service that is a proxy for the message service provider, or any suitable messaging service. The message client can manage an email account. The message client may alternatively manage social network messaging, instant messaging, information streams or any suitable source of messages. The message client can receive messages and appropriately incorporates those messages into a rendered interface. The message client may additionally send messages. Additionally, the message client can translate inputs detected by the gesture detection engine into corresponding response for the message service provider. For example, moving an email to a list may involve creating a folder and adding the message to the folder. Moving a message to trash may queue the message for deletion on the message system provider.

The mailbox view controller of the application can function to render the interface on the display of the device. The mailbox view controller can depict messages as a list of message items. The mailbox view controller additionally cooperatively works with the gesture detection engine to render input feedback while the gesture is in progress. For example, as a user slides a touch contact point horizontally across a message, the action of the current gesture state is displayed according to the planned execution. The mailbox view controller may additionally be configured to display full messages, lists/folders/streams of an account, and/or any suitable portion of the application interface. In one variation, the navigation of directories (e.g., folders or lists) of a mail account is accessed through interface interaction that promotes a consistent cognitive mapping of directory location and the sorting behavior of gesture-actions. The mailbox view controller may alternatively be divided into any suitable assortment of components.

The gesture detection engine can function to analyze and convert user input to actions by the message client. The gesture detection engine can execute any number of heuristics to identify different classes of input gestures. There can be a plurality of defined gestures that correspond to various message actions. In some embodiments, the gesture detection engine is coupled to the touch events of a touch screen device. The gesture detection engine of a touch device can process the touch start position, the direction of touch motion, velocity of touch motion, acceleration of touch motion, the distance of touch motion, time-progression of touch motion, pressure of touch input, number of touch inputs, relationship of multiple touch inputs, and/or any suitable parameter of the touch input. In another embodiment, the gesture detection engine processes natural user motion detected by a vision system. Motions of a hand may have similar gesture patterns as touch gesture patterns, but additional or alternative gestures may be used. Similarly, device motion sensors such as accelerometers and gyroscopic sensors of a mobile device may be used to convert movement of a device to an action. As yet another variation, desktop computers can use cursor input devices such as a mouse or trackpad to receive inputs, those gestures may then be translated to actions. The gestures can be configured for the form of input device.

Figure 10:
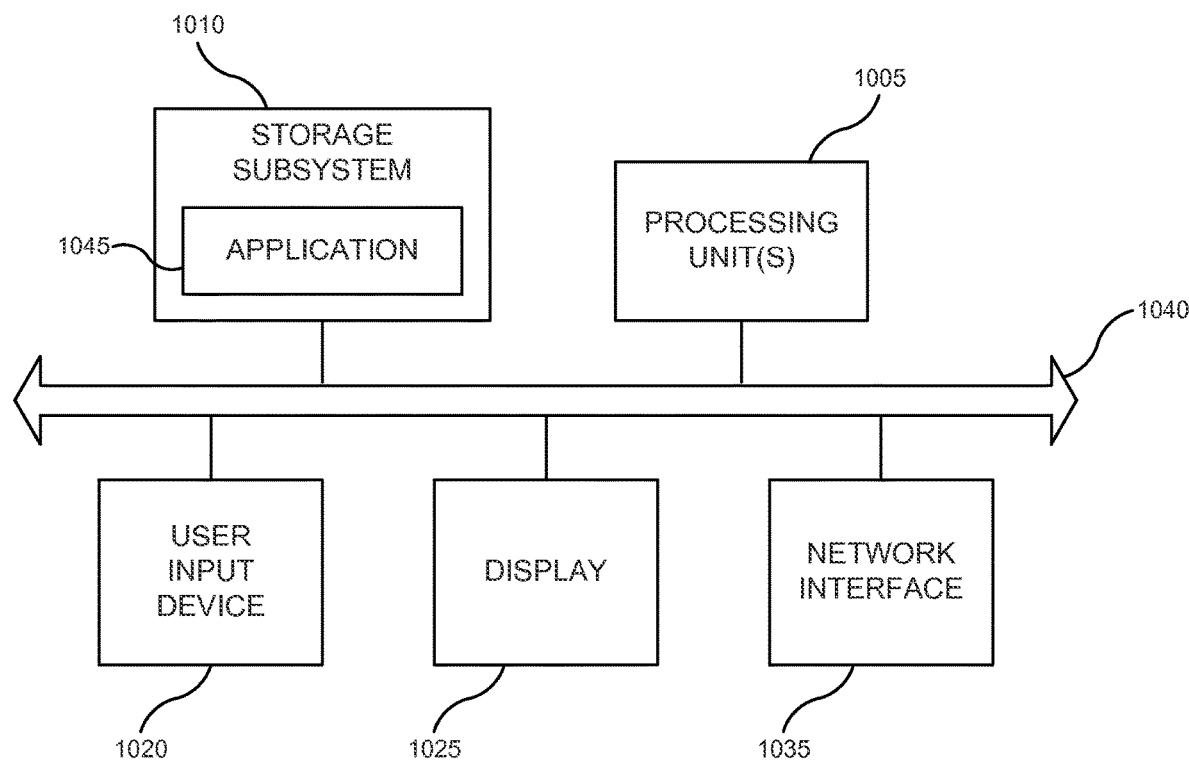
FIG. 10 shows an example of a computer system that can be used in accordance with some embodiments of the present invention.

FIG. 10 illustrates a computer system 1000 according to an embodiment of the present invention. Computer system 1000 can include processing unit(s) 1005, storage subsystem 1010, input devices 1020, display 1025, network interface 1035, and bus 1040. Computer system 1000 is a high-level block diagram of a system that can represent a mobile device, a server computer, or any of the computing devices illustrated in FIGS. 1-2 and described herein.

Processing unit(s) 1005 can include a single processor, which can have one or more cores, or multiple processors. In some embodiments, processing unit(s) 1005 can include a general-purpose primary processor as well as one or more special-purpose co-processors such as graphics processors, digital signal processors, or the like.

Storage subsystem 1010 can include various memory units such as a system memory, a read-only memory (ROM), and a persistent storage device. A ROM can store static data and instructions that are used by processing unit(s) 1005 and other modules of electronic device 1000. A persistent storage device can be a non-volatile readable and writable memory unit that stores instructions and data even when computer system 1000 is powered down. System memory can be implemented using volatile read-and-write memory, such as dynamic random access memory, or non-volatile memory as desired. The system memory can store some or all of the instructions and data that are currently in use by processing unit(s) 1005.

Storage subsystem 1010 or units thereof can be implemented using any combination of computer-readable storage media including semiconductor memory chips of various types (DRAM, SRAM, SDRAM, flash memory, programmable ROM) and so on. Magnetic and/or optical disks can also be used. In some embodiments, storage subsystem 1010 can include removable storage media that can be readable and/or writeable; examples of such media include compact discs (CD), read-only digital versatile discs (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic "floppy" disks, and so on. The computer-readable storage media do not include carrier waves and transitory electronic signals passing wirelessly or over wired connections.

In some embodiments, storage subsystem 1010 can store one or more software programs to be executed by processing unit(s) 1005, such as applications 1045. For example, on a mobile device, applications 1045 can include a client app (e.g., 130 in FIG. 1). In another example, on a server computer, applications 1045 can include various software modules for performing the processing described herein. "Software" refers generally to sequences of instructions that, when executed by processing unit(s) 1005, cause computer system 1000 to perform various operations, thus defining one or more specific machine implementations that execute and perform the operations of the software programs. The instructions can be stored as firmware residing inread-only memory and/or applications stored in magnetic storage that can be read into memory for processing by a processor. Software can be implemented as a single program or a collection of separate programs or program modules that interact as desired. Programs and/or data can be stored in non-volatile storage and copied in whole or in part to volatile working memory during program execution. From storage subsystem 1010, processing unit(s) 1005 can retrieve program instructions to execute and data to process in order to execute various operations described herein. Through suitable programming, processing unit(s) 1005 can provide various functionality for computer system 1000. For example, processing unit(s) 1005 can execute applications 1045.

A user interface can be provided by one or more user input devices 1020, display device 1025, and/or and one or more other user output devices (not shown). Input devices 1020 can include any device via which a user can provide signals to computing system 1000; computing system 1000 can interpret the signals as indicative of particular user requests or information.

Display 1025 can display images generated by computer system 1000 and can include various image generation technologies. Some embodiments can include a device such as a touchscreen that functions as both touch-sensitive input device and display device. In some embodiments, other user output devices can be provided in addition to or instead of display 1025.

In some embodiments, the user interface can provide a graphical user interface, in which visible image elements in certain areas of display 1025 are defined as active elements or control elements that the user selects using user input devices 1020. For example, the user can manipulate a user input device to position an on-screen cursor or pointer over the control element, then click a button or tap a touch-sensitive surface to indicate the selection. Alternatively, the user can touch the control element (e.g., with a finger or stylus) on a touchscreen device. Other user interfaces can also be implemented.

Network interface 1035 can provide voice and/or data communication capability for computer system 1000. In some embodiments, network interface 1035 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some embodiments, network interface 1035 can provide wired network connectivity (e.g., Ethernet) in addition to or instead of a wireless interface. Network interface 1035 can be implemented using a combination of hardware (e.g., antennas, modulators/demodulators, encoders/decoders, and other analog and/or digital signal processing circuits) and software components.

Bus 1040 can include various system, peripheral, and chipset buses that communicatively connect the numerous internal devices of computer system 1000. For example, bus 1040 can communicatively couple processing unit(s) 1005 with storage subsystem 1010. Bus 1040 also connects to input devices 1020 and display 1025. Bus 1040 also couples computer system 1000 to a network through network interface 1035. In this manner, computer system 1000 can be a part of a network of multiple computer systems (e.g., a local area network (LAN), a wide area network (WAN), an Intranet, or a network of networks, such as the Internet. Any or all components of computer system 1000 can be used in conjunction with the invention.

Some embodiments include electronic components, such as microprocessors, storage and memory that store computer program instructions in a computer-readable storage medium. Many of the features described in this specification can be implemented as processes that are specified as a set of program instructions encoded on a computer-readable storage medium. When these program instructions are executed by one or more processing units, they cause the processing unit(s) to perform various operations indicated in the program instructions. Examples of program instructions or computer code include machine code, such as is produced by a compiler, and files including higher-level code that are executed by a computer, an electronic component, or a microprocessor using an interpreter.

It will be appreciated that computer system 1000 is illustrative and that variations and modifications are possible. Computer system 1000 can have other capabilities not specifically described here. Further, while computer system 1000 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

As a person skilled in the art will recognize from the previous detailed description and from the figures and claims, modifications and changes can be made without departing from the scope of this invention defined in the following claims.

The invention claimed is:

1. A method comprising:
receiving a network request to create a reservation, the reservation to activate a predefined function of a particular user-installed application, wherein receiving the network request to create the reservation occurs prior to providing the particular user-installed application for installation at a user device;
based on the receiving the network request to create the reservation, creating and storing a reservation record for the reservation, the reservation record for the reservation associated with a reservation code for the reservation;
not until after creating and storing the reservation record for the reservation, providing the particular user-installed application for installation at the user device, wherein the particular user-installed application, when installed and executed at the user device, is configured to allow a user input of the reservation code, and is configured to send a network request to claim the reservation based on the user input of the reservation code;
receiving a network request to claim the reservation, wherein the network request to claim the reservation received includes the reservation code;
based on the receiving the network request to claim the reservation, activating the predefined function of the particular user-installed application for the reservation; and
wherein the method is performed by one or more processors.

2. The method of claim 1, wherein the network request to create a reservation to activate the predefined function of the particular user-installed application is based on a corresponding network request sent by a web browser application executing at the user device, the corresponding network request being sent by the web browser application executing at the user device prior to providing the particular user-installed application for installation at the user device.

3. The method of claim 1, further comprising:
sending one or more network messages comprising the reservation code toward the user device thereby causing the reservation code to be received at the user device.

4. The method of claim 1, wherein the reservation is in a queue of reservations; and wherein the particular user-installed application, when installed and executed at the user device, is configured to: display at the user device a number of other reservations in the queue of reservations ahead of the reservation in the queue of reservations, based on the user input of the reservation code; and configured to update display at the user device of the number of other reservations in the queue of reservations ahead of the reservation in the queue of reservations after a reservation in the queue of reservations is allowed.

5. The method of claim 1, wherein the reservation is in a queue of reservations; and wherein the particular user-installed application, when installed and executed at the user device, is configured to: display at the user device a number of other reservations in the queue of reservations behind the reservation in the queue of reservations, based on the user input of the reservation code; and configured to update display at the user device of the number of other reservations in the queue of reservations behind the reservation in the queue of reservations after a new reservation is added to the queue of reservations.

6. The method of claim 1, wherein providing the particular user-installed application for installation at the user device is based on releasing the particular user-installed application through a mobile application marketplace.

7. The method of claim 1, wherein:
the predefined function of the particular user-installed application includes accessing a network-based service using the particular user-installed application;
the particular user-installed application, when installed and executed at the user device, is configured to allow a user input to create or associate a user account with the network-based service after the reservation is allowed; and
the method further comprises: after allowing the reservation, creating or associating the user account with the network-based service.

8. One or more non-transitory computer-readable storage media storing one or more programs configured for execution by one or more processors, the one or more programs including instructions configured for:
receiving a network request to create a reservation to activate a predefined function of a particular user-installed application;
based on the receiving the network request to create the reservation, creating and storing a reservation record for the reservation, the reservation record for the reservation associated with a reservation code for the reservation;
providing the particular user-installed application for installation at a user device;
wherein the particular user-installed application, when installed and executed at the user device, is configured to allow a user input of the reservation code, is configured to send a network request to claim the reservation based on the user input of the reservation code, and is configured to allow a user input to create or associate a user account with a network-based service after the reservation is allowed;
wherein the receiving the network request to create the reservation is performed prior to the providing the particular user-installed application for installation at the user device;
receiving a network request to claim the reservation, the network request to claim the reservation received including the reservation code;
after allowing the reservation, creating or associating the user account with the network-based service; and
activating the predefined function of the particular user-installed application for the reservation.

9. The one or more non-transitory computer-readable storage media of claim 8, wherein the network request to create a reservation to activate the predefined function of the particular user-installed application is based on a corresponding network request sent by a web browser application executing at the user device, the corresponding network request being sent by the web browser application executing at the user device prior to providing the particular user-installed application for installation at the user device.

10. The one or more non-transitory computer-readable storage media of claim 8, including further instructions configured for:
sending one or more network messages comprising the reservation code toward the user device thereby causing the reservation code to be received at the user device.

11. The one or more non-transitory computer-readable storage media of claim 8, wherein the reservation is in a queue of reservations; and wherein the particular user-installed application, when installed and executed at the user device, is configured to: display at the user device a number of other reservations in the queue of reservations ahead of the reservation in the queue of reservations, based on the user input of the reservation code; and configured to update display at the user device of the number of other reservations in the queue of reservations ahead of the reservation in the queue of reservations after a reservation in the queue of reservations is allowed.

12. The one or more non-transitory computer-readable storage media of claim 8, wherein the reservation is in a queue of reservations; and wherein the particular user-installed application, when installed and executed at the user device, is configured to: display at the user device a number of other reservations in the queue of reservations behind the reservation in the queue of reservations, based on the user input of the reservation code; and configured to update display at the user device of the number of other reservations in the queue of reservations behind the reservation in the queue of reservations after a new reservation is added to the queue of reservations.

13. The one or more non-transitory computer-readable storage media of claim 8, including further instructions configured for:
not until after creating and storing the reservation record for the reservation, providing the particular user-installed application for installation at the user device; and
wherein providing the particular user-installed application for installation at the user device is based on releasing the particular user-installed application through a mobile application marketplace.

14. The one or more non-transitory computer-readable storage media of claim 8, wherein activating the predefined function of the particular user-installed application for the reservation is performed based on the received network request to claim the reservation.

15. A system comprising:
one or more processors;
one or more computer-readable storage media storing instructions which, when executed by the one or more processors, cause:
receiving a network request to create a reservation, the reservation to activate a predefined function of a particular user-installed application, wherein receiving the network request to create the reservation occurs prior to providing the particular user-installed application for installation at a user device;
based on the receiving the network request to create the reservation, creating and storing a reservation record for the reservation, the reservation record for the reservation associated with a reservation code for the reservation;
not until after creating and storing the reservation record for the reservation, providing the particular user-installed application for installation at the user device, wherein the particular user-installed application, when installed and executed at the user device, is configured to allow a user input of the reservation code, and is configured to send a network request to claim the reservation based on the user input of the reservation code;
receiving a network request to claim the reservation, wherein the network request to claim the reservation received includes the reservation code; and
based on the receiving the network request to claim the reservation, activating the predefined function of the particular user-installed application for the reservation.

16. The system of claim 15, wherein the network request to create a reservation to activate the predefined function of the particular user-install application is based on a corresponding network request sent by a web browser application executing at the user device, the corresponding network request being sent by the web browser application executing at the user device prior to providing the particular user-installed application for installation at the user device.

17. The system of claim 15, the one or more computer-readable storage media further comprising instructions which, when executed by the one or more processors, cause:
sending one or more network messages comprising the reservation code toward the user device thereby causing the reservation code to be received at the user device.

18. The system of claim 15, wherein the reservation is in a queue of reservations; and wherein the particular user-installed application, when installed and executed at the user device, is configured to display an anticipated time when the reservation will be allowed.

19. The system of claim 15, wherein the reservation is in a queue of reservations; and wherein the particular user-installed application, when installed and executed at the user device, is configured to: display at the user device a number of other reservations in the queue of reservations behind the reservation in the queue of reservations, based on the user input of the reservation code; and configured to update display at the user device of the number of other reservations in the queue of reservations behind the reservation in the queue of reservations after a new reservation is added to the queue of reservations.

20. The system of claim 15, wherein providing the particular user-installed application for installation at the user device is based on releasing the particular user-installed application through a mobile application marketplace.

\* \* \* \* \*